Oct. 14, 1941.        T. ZUSCHLAG        2,258,837
ELECTRICAL TESTING
Filed May 18, 1939        3 Sheets-Sheet 2
Fig. 2,
Fig. 3,
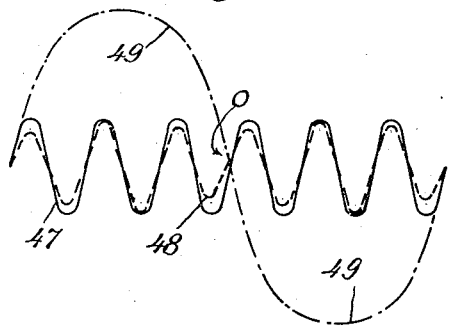
Fig. 4,
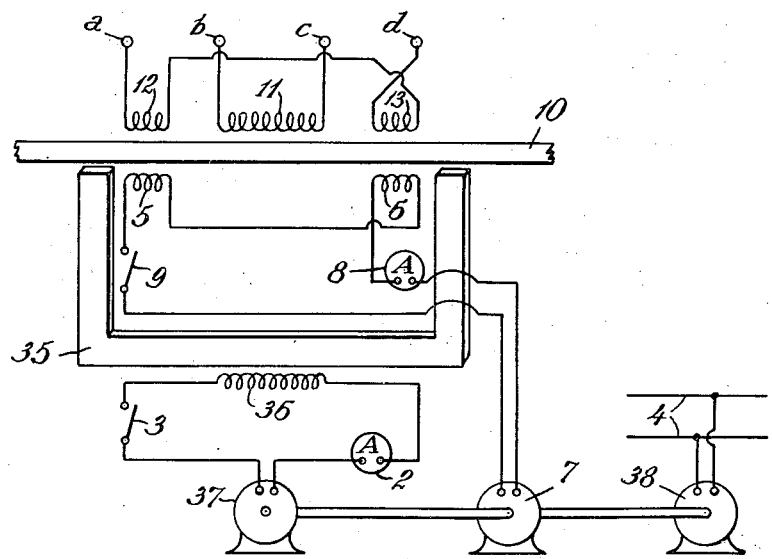
INVENTOR
Theodore Zuschlag
BY
Pennie, Davis, Marvin and Edmonds.
ATTORNEYS Oct. 14, 1941.  T. ZUSCHLAG  2,258,837
ELECTRICAL TESTING
Filed May 18, 1939  3 Sheets-Sheet 3
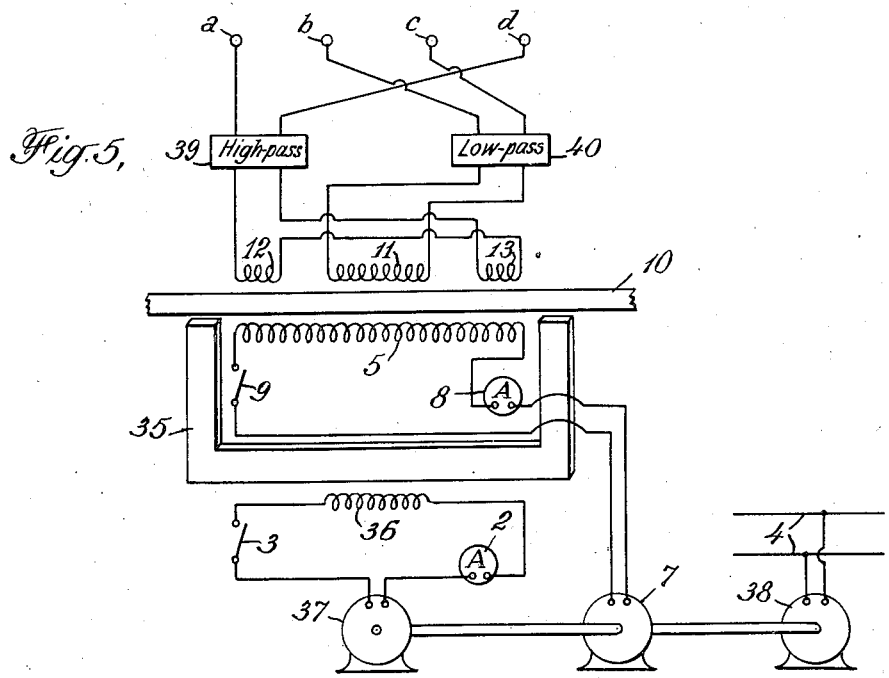
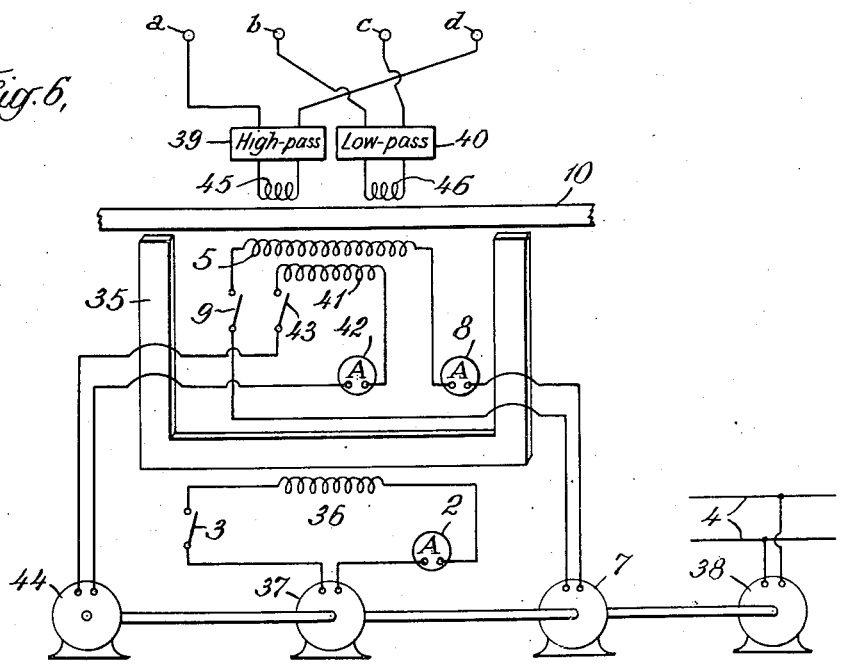
INVENTOR
Theodor Zuschlag
BY
Pennie, Davis, Marvin and Edmonds.
ATTORNEYS Patented Oct. 14, 1941

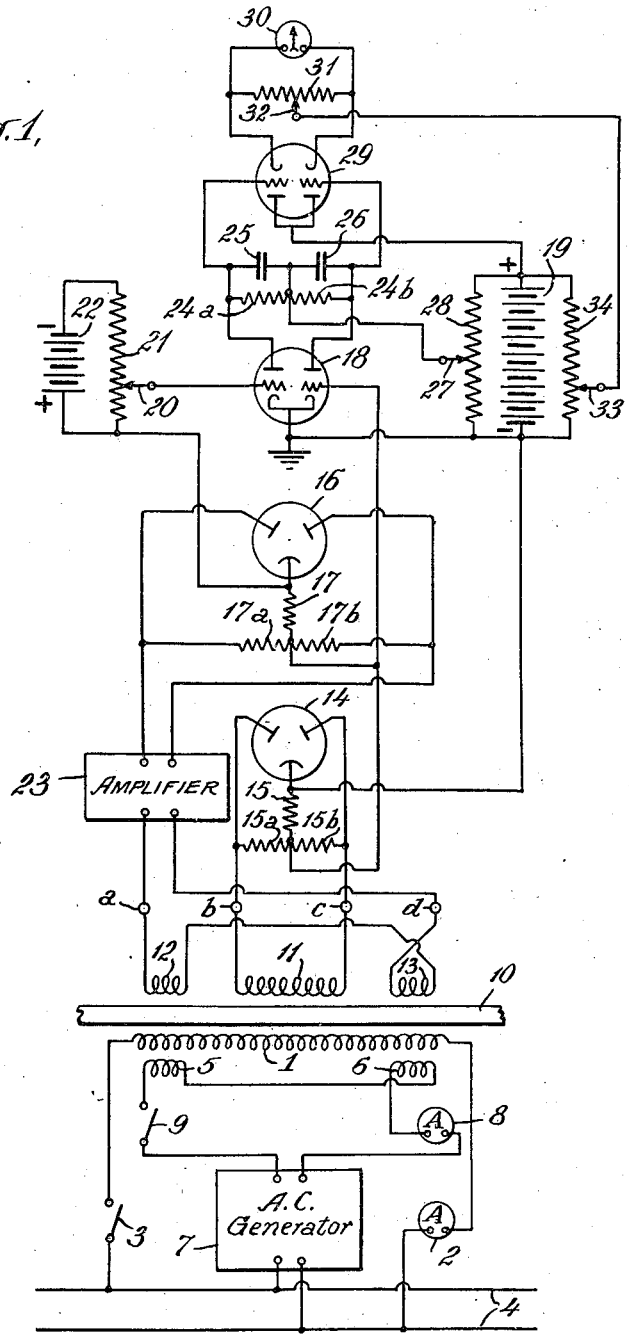

2,258,837

UNITED STATES PATENT OFFICE 2,258,837

ELECTRICAL TESTING

Theodor Zuschlag, West Englewood, N. J., assignor to Magnetic Analysis Corporation, Long Island City, N. Y., a corporation of New York Application May 18, 1939, Serial No. 274,309

17 Claims. (Cl. 175—183)

This invention relates to electrical testing, especially by induction, of metallic bodies for physical defects or structural variations, and has for its principal object the provision of an improved method and apparatus for so testing metallic bodies.

Physical defects (such as cracks, seams, laps, slivers, and strains) and structural variations (such as of thickness or composition) occurring in metallic bodies affect the electrical and magnetic properties thereof. Consequently, electrical inspection by induction provides convenient and sensitive means for detecting the presence of defects or variations in such bodies.

The procedure heretofore generally followed in investigating the electrical or magnetic properties of a metallic body for the detection of defects or structural variations involved inserting the body in a coil energized by electric current, and observing in a testing circuit the variations of a voltage induced therein and influenced by the body undergoing test. The voltage induced in such a testing circuit is affected by defects or variations in the test specimen which influence the electrical or magnetic properties thereof. (Hereinafter, the term "defects" will be assumed to include structural variations even though they be desirable and not defects in the ordinary sense.)

A great variety of defects affect the electrical properties of a metallic body as well as the magnetic properties thereof, and the presence of defects which affect electrical properties may be detected in both magnetic and nonmagnetic materials. Thus, a crack or other plane of weakness or incipient rupture in a metallic specimen generally affects the electrical resistance of the specimen and correspondingly affects the strength and distribution of eddy currents set up in the specimen by an energizing alternating field. Certain physical defects which influence only magnetic properties, on the other hand, are observable only by suitable testing of specimens of magnetic or magnetizable material. Magnetic properties, moreover, are influenced considerably by mechanical strains and stresses existing within the body of the specimen under test in addition to influences caused by defects such as cracks, seams, contaminating material, etc.

In view of the foregoing considerations, it often is preferable to base an examination of a body for physical defects upon an investigation of the electrical properties thereof (particularly, those involving eddy current distribution) rather than upon an investigation of the magnetic properties of the body. One of the factors which heretofore have made it difficult to base an examination for defects in a magnetizable body upon an investigation of eddy current distribution rather than upon magnetic flux variation is that the observable effect of eddy current changes is of much less magnitude than that of changes in magnetic properties. This is particularly true when the energizing alternating current used in making the investigation is of low frequency, but even when high-frequency alternating current is employed, the greater effect of variations due to eddy currents on the variations of the voltage being investigated is not always more readily observable because of the superimposed and comparatively greater effects thereon due to variations in magnetic flux distribution.

In order to overcome these difficulties encountered in endeavoring to determine the existence of defects in a magnetizable specimen through study of eddy current disturbances therein, it has been proposed (see Austrian Patent No. 98,935 published December 27, 1924) to saturate the specimen magnetically in a strong magnetic field of fixed polarity, and thus to suppress the influence on the test results of minor magnetic strain variations occurring in the body being tested by minimizing the opportunity of magnetic flux variations to influence the test observations. Direct-current magnetization of the specimen being tested is of help in limiting the investigation primarily to eddy current disturbances, but such magnetization of the material being tested is frequently objectionable. Material magnetized for purposes of test is sometimes difficult to demagnetize completely, and if magnetized material is stored with unmagnetized material, the latter is apt to become magnetized. Magnetization of materials such as steels markedly impairs their value for many purposes.

The present invention provides, in a method for electrically testing a metallic body for physical defects or structural variations involving inducing in a testing circuit an alternating voltage influenced by the body, the improvement which comprises subjecting the body simultaneously to the action of two or more magnetic fields all of different characteristics, two of which must be alternating fields of different frequencies, whereas another may be a direct current field or an alternating field of a frequency different from that of the others. Preferably the fields should be of different strengths, and the field of higher frequency should be of lower strength than the field of lower frequency or the direct-current field. Thus a relatively high-strength alternating field of a frequency of the order of 60 cycles per second may be employed in conjunction with an alternating field of relatively low strength but having a frequency of the order of 100–3000 cycles per second. The invention also includes a new combination of apparatus suitable for electrical testing of metallic bodies.

The variations of the voltage induced in the testing circuit may be investigated with the aid of any suitable known apparatus, such as an oscillograph. Particularly in testing magnetic materials, however, the use of apparatus such as the oscillograph which is affected by the full wave of the voltage induced in the testing circuit is not recommended, for in such event the test results are apt to be influenced and confused by portions of the wave form investigated which have no value in that they lack significance and are not required to be analyzed for purposes of the test. It is therefore preferred, particularly in testing magnetic materials, to investigate the instantaneous amplitude of the voltage induced in the testing circuit at a predetermined phase point of the cycle of one of the electrical fields to which the test specimen is subjected. Using two alternating fields such investigation advantageously is made at the phase point of the cycle of the field of lower frequency and higher strength which corresponds to maximum magnetic saturation (i. e., highest magnetization value) of the test specimen. At this point the instantaneous amplitude of the voltage induced in the testing circuit is influenced primarily more by eddy current distribution than by the magnetic flux in the test specimen. On the other hand, using a direct and one alternating field such investigation, preferably, is made at a phase point of the alternating field which corresponds to a maximum amplitude of the induced secondary voltage.

For the purpose of investigating the instantaneous amplitude of the voltage induced in the test circuit, I prefer to employ the analyzing apparatus and circuit or a suitable modification thereof, such as described in my Patents No. 2,140,662, dated December 20, 1938, and No. 2,144,476, dated January 17, 1939, and in the patent issued to Thomas C. Hana, No. 2,152,690 on April 4, 1939.

In accordance with the method and apparatus of the present invention, as above mentioned, the advantage of strong magnetization of a magnetizable body undergoing test may be secured by means of direct current magnetization or low-frequency alternating current magnetization. The new method is of particular value in testing magnetizable bodies for physical defects, but it may be used, of course, and with advantage, for inspecting non-magnetic as well as magnetic metallic bodies.

The method and apparatus of the invention will be better understood in the light of the following detailed description, considered in conjunction with the accompanying drawings in which:

Fig. 1 is a circuit diagram of an electrical testing circuit designed for carrying out the method of the invention;

Fig. 2 is a diagrammatic representation of a wave form such as is induced in the testing circuit as a result of the individual and combined action of a direct-current field and an alternating field of suitable frequency;

Fig. 3 is a diagrammatic representation of a wave form such as is induced in the testing circuit as a result of the individual and combined action of two alternating fields of different frequencies;

Fig. 4 is a circuit diagram of a modified form of energizing circuit, for impressing two different magnetic fields upon a test specimen, which may be substituted in the system of Fig. 1; and Figs. 5 and 6 are diagrams of further modifications of energizing circuits which may be substituted in the system of Figure 1.

Referring to the circuit diagram of Figure 1, a main energizing coil 1 is connected in series with an ammeter 2 and a circuit switch 3 across a supply line 4 carrying either direct current or alternating current of commercial frequency, such as 60 cycles. Two auxiliary energizing coils 5 and 6, located symmetrically and coaxially within main coil 1 and adjacent the ends thereof, are connected in opposition with each other and in series with an ammeter 8 and a circuit switch 9 to the output of an alternating current generator, or oscillator, 7, producing any suitable frequency and, preferably, connected to and energized by line supply 4.

Three secondary test coils 11, 12, 13 are symmetrically and coaxially located within the three energizing coils 1, 5 and 6. The center test coil 11 is disposed symmetrically with regard to the auxiliary energizing coils 5 and 6. The ends of test coil 11 are connected to the anodes of a full-wave rectifier tube 14, the cathode of which is connected in series with the bias resistor 15 to the common point of two identical resistors 15a and 15b shunted across the ends of coil 11. The two outside test coils 12 and 13 are symmetrically located with regard to the auxiliary energizing coils 5 and 6 and are connected in opposition with each other to amplifier 23. The output of this amplifier is connected to the anodes of a second full-wave rectifier tube 16. The cathode of rectifier tube 16 is connected in series with bias resistor 17 to the common point of the two identical resistors 17a and 17b shunted across the anodes of rectifier tube 16. The cathode of rectifier tube 14 is grounded and directly connected with the two cathodes of the duplex-triode amplifier tube 18 and the negative pole of anode power supply 19. One grid of duplex amplifier tube 18 is connected to the center point of cathode resistors 15a and 15b, while the other grid is connected to the slider 20 of potentiometer 21 shunted across bias battery 22. The positive pole of this bias battery is connected to the cathode of the full-wave rectifier tube 16. The anodes of the duplex amplifier tube 18 are connected in series, respectively, with the anode resistors 24a and 24b, shunted by the capacities 25, 26, to the slider 27 of the potential-supply potentiometer 28 connected across anode power supply 19.

The positive terminal of anode potential supply 19 is connected to the anodes of duplex-triode amplifier tube 29, the grids of which are connected to the anodes of duplex amplifier tube 18. The two cathodes of duplex amplifier tube 29 are connected to a galvanometer 30 shunted across the ends of potentiometer 31, the slider 32 of which is connected to the slider 33 of potentiometer 34 shunted across anode supply 19.

*Operation*

In operating the apparatus described, a test specimen, for example a metal bar, 10 is disposed in inductive relationship with the coils 1, 5, 6, 11, 12 and 13, for instance, by insertion into the interior of these coils. The switches 3 and 9 in circuit with the primary energizing windings 1, 5 and 6 are closed and the current values noted on ammeters 2 and 8. In this manner, the test specimen is exposed to the action of two magnetic fields of different character.

The mutual effect of the two energizing fields upon each other is reduced by the fact that the auxiliary energizing coils 5 and 6 are connected in series opposition with regard to the main energizing coil. This arrangement thereby eliminates the necessity of using special filter circuits in the two energizing systems. While there is no definite rule regarding the frequency relationship of the energizing field, it is preferable to use a low strength current of a frequency of about 1000 cycles for the excitation of coils 5 and 6 and a high strength direct current, or an alternating current with a frequency of 60 cycles, say, for the main energizing coil 1. If two alternating fields are used the two frequencies may be "synchronized" to the extent that the higher frequency represents an harmonic of the lower frequency although this requirement is not essential. Hence "generator" 7 may, for example, be a 1000-cycle oscillator, or an harmonic generator operating on a 60 cycle supply line and delivering, say, 1080 cycles.

The effect of superimposing two fields of different character is schematically represented in Figures 2 and 3. Assuming, first, a test specimen 10 inserted in coil system 1, 5, 6, 11, 12, 13, and switch 3 open, the resultant E. M. F. induced in coil 11 is indicated by the full line 47 of Figures 2 and 3. Closing switch 3 and applying a heavy direct current to coil 1, the resultant high magnetization which may or may not approach saturation will reduce the amplitude of the induced E. M. F. as indicated by the dashed line 48 in Figure 2. The decrease in amplitude is due to the decrease in the value of apparent permeability generally connected with high magnetization or saturation when a heavy direct-current field is applied.

Assuming, now, a heavy low-frequency alternating current flow in coil 1, the E. M. F. induced in coil 11 is indicated by the dash-dot line 49 of Figure 3 representing one cycle of the low-frequency wave. It will be noted that the E. M. F. induced in this coil does not show any effect of the high-frequency oscillations set up in coils 5 and 6 due to the employed series opposition arrangement. On the other hand, the E. M. F. induced in coils 12, 13 is not directly affected by the low-frequency variations, yet shows a distinct indirect effect produced by periodic variation in apparent permeability due to the heavy low-frequency energization. The permeability is least for highest magnetization values, and these occur at the zero amplitude points of the induced low-frequency E. M. F., where the magnetic saturation is a maximum, which is the zero point indicated by the arrow in Fig. 3.

As mentioned before, energizing coils 5 and 6 are in neutral inductive relationship with respect to energizing coil 1, while the voltage induced in secondary 11 and applied to the anodes of rectifier tube 14 is dependent upon the field of coil 1 only and not upon the fields of coils 5 and 6. The rectified voltage of coil 11 is applied between the cathode and both grids of duplex amplifier tube 18 and, generally, is high enough to cut off completely the anode current flow in both sections of amplifier tube 18 except during the periods of substantially zero induction in coil 11. This means that anode current flow through the two sections of amplifier tube 18 is possible only during periods of maximum magnetization by coil 1. The periodic flow of anode current in both sections of tube 18 causes a periodic charging of condensers 25, 26 and also a periodic potential change at the grids of duplex amplifier tube 29 in the manner described in the aforementioned patents.

For preliminary adjustment of the apparatus, switch 9 is opened and the slider 33 of potentiometer 34 is adjusted until galvanometer 30 shows no deflection. The degree of sensitivity of this meter can be varied by changing the setting of slider 32 of potentiometer 31. It will be evident that when coil 1 is energized by direct current any voltage induced in coil 11 has no significance. In that case the necessary adjustments may be made by manipulation of potentiometer sliders 20, 27 and 33.

Now, closing switch 9, the high-frequency voltage induced in coils 12 and 13 is rectified by rectifier tube 16 and applied to the left grid of duplex amplifier tube 18. If necessary, a suitable amplifier 23 may be connected to amplify this high-frequency voltage before rectification.

The rectified voltage of coils 12 and 13 is applied with reversed polarity as compared with the rectified voltage of coil 11. Naturally, this condition causes a change in the grid potential acting on amplifier tube 18 and a strong deflection of galvanometer 30 due to the unsymmetrical anode current flow produced in tube 18. This resultant deflection of the meter can be reduced, and even eliminated, by increasing the negative bias on the left grid of amplifier tube 18 by adjusting the slider 20 of potentiometer 21. Such increase in negative bias has the effect of lowering the positive potential set up by the rectified voltage of coils 12 and 13 until the effects of the peak values of the potentials between ground and the two grids, respectively, of tube 18 are alike. The adjustment of the apparatus obtained in this manner is kept constant while the standard test specimen 10, as well as any number of additional test specimens, is moved through coil combination 1, 5, 6, 11, 12, 13. Proceeding in this manner, defective sections in metallic material are indicated more readily than by using either high-frequency or low-frequency energization alone.

The indications are not dependent primarily upon the main energizing field set up by coil 1 but upon the auxiliary fields induced by coils 5 and 6. For this reason, the same instrument may be used to inspect magnetic and non-magnetic material. In testing non-magnetic material, it is, of course, not necessary to use the main energizing coil 1 at all. For this type of investigation, main switch 3 may be kept open permanently. Assuming, then, that a high-frequency field only is applied to the coil system 5, 6, 11, 12, 13 and assuming further that a standard specimen of non-magnetic material is inserted into the coils, then the output of amplifier tube 29 may be balanced for zero meter reading by adjusting the bias voltage to the left grid of duplex tube 18 by means of slider 20. The amplitude of the output voltage of coils 12 and 13 thus compensated is changed by the existence of flaws or variations in any kind of metallic material. Any change in this voltage, in turn, will produce an unsymmetrical grid potential and cause a deflection of galvanometer 30.

On the other hand, it may be advantageous to inspect non-magnetic material by means of two alternating exciting fields of different frequencies. Proceeding in this manner and utilizing for the investigation of the lower frequency field the method and aparatus described in the above-mentioned United States patents, it is possible not only to obtain greater penetration, but also to provide for a differentiation between various indications as to the depths of defects. It is well-known that the penetration of high-frequency fields is very limited. This means that a shallow crack may cause the same indication as a deep crack. Lower frequency current, on the other hand, penetrates more deeply, and its use may result in a more outstanding indication for a deep crack than for a shallow flaw. It is obvious that these effects may be utilized for classification of various indications as to the depth and extension of the flaws indicated by this arrangement. By superimposing two frequencies on the specimen, the field is substantially constant with regard to one frequency only, while the composite resultant field must be considered as cyclically or rhythmically modulated with regard to the two frequencies employed.

In place of energizing coil 1, a yoke arrangement as indicated in Figure 4 may be used for testing magnetic specimens. Here the two auxiliary coils 5 and 6 surrounding the test specimen 10 and connected in series with switch 9 and ammeter 8 to a generator 7 are located within a magnetizing yoke 35 separated from the test specimen by a small air gap. This yoke, of magnetic material, is energized by a suitable energizing winding 36 connected in series with switch 3 and ammeter 2 to a generator 37. The two generators 7 and 37 are rigidly coupled to a motor 38 preferably operated from line supply 4. The operation of this arrangement is similar to the operation of the arrangement shown in Figure 1. The use of rotating generators rigidly coupled has the advantage of providing a permanently synchronized frequency relationship which for certain test purposes may produce superior results. The advantages resulting from the use of mechanical or rotating generators or alternators as in Figures 4, 5 and 6 may also be had by substituting such generators in the arrangement of Figure 1; and conversely, if desired, the vacuum tube or other non-mechanical type of alternating current generator represented in Figure 1 may be substituted in the arrangements of Figures 4, 5 and 6.

Among the several advantages introduced by use of the magnetic yoke shown in Figures 4, 5 and 6 is the ease with which such apparatus is adapted to test continuous specimens such as cables and long metallic ribbons and wires. Were the yoke not employed the test specimen would usually have to be threaded physically through the large coil 1, (Fig. 1); but the need for this coil is eliminated by use of the yoke 35. Even when employing a yoke it is desirable to pass the specimen through certain of the coils, such as coils 11, 12, 13 of Figs. 4 and 5 and coils 45, 46 of Fig. 6, but these coils are comparatively small and may be constructed so as to open, thus allowing a long specimen under test to be readily inserted and removed, as disclosed in my U. S. Patent 2,102,452, granted December 14, 1937.

For specific problems, such as for instance the inspection of cables, the energization arrangement of Figure 4 may be modified by the elimination of one of the auxiliary coils 5 or 6 as shown in Figure 5. This change, however, makes it advisable to utilize filtering means, at least in the pick-up circuits of the instrument. Referring to Figure 5, the output voltages of secondary coils 11, 12 and 13 are passed through a high-pass filter 39 and a low-pass filter 40, respectively, before they enter the indicator proper which in this case records any difference in voltage induced in coils 12 and 13 and may be used to detect the beginning and end of short internal defects but not continuous defects running the full length of the material. These high-pass and low-pass filters should be designed so as to pass, respectively, the high-frequency and low-frequency output currents and so as to reject, respectively, the low-frequency and high-frequency output currents. On the other hand, in the arrangement of Figure 1, the coil system itself constitutes equivalent filters.

Continuous defects, such as flaws running the full length of the specimen or material, may be indicated by means of the arrangement of Figure 6 which comprises still another modification of the energizing circuit which combines direct-current, low-frequency and high-frequency excitation. For this purpose there is provided an additional primary coil 41 connected in series with an ammeter 42 and a switch 43 to a direct-current generator 44 driven by motor 38. Instead of the three secondary coils of Figure 5 only two coils, 45 and 46, are connected to high-pass and low-pass filters 39 and 40, respectively. Otherwise this arrangement is similar to that of Figure 5. The specific advantage of the arrangement of Figure 6 resides in the attendant possibility of increasing the apparent penetration of alternating fields into ferrous (magnetic) material, which in turn results in a more complete and thorough inspection than is possible with any one of the energization combinations mentioned previously. It also detects more clearly defects the direction of which is effectively transverse to the direction of the magnetic field generated by the energizing coils.

I claim:

1. In a method for electrically testing a magnetizable body for physical defects which involves inducing in a testing circuit an alternating voltage having an amplitude influenced by said body, the improvement which comprises subjecting said body to a first magnetic field in a manner substantially to periodically saturate said body magnetically, subjecting the thus periodically-saturated body simultaneously to the action of a second magnetic field of different frequency than said first field, and investigating the amplitude of the voltage induced in said testing circuit while said body is subjected to both of said fields.

2. In a method for electrically testing a magnetizable body for physical defects which involves inducing in a testing circuit an alternating voltage having an amplitude influenced by said body, the improvement which comprises subjecting said body to a first magnetic field of relatively high strength in a manner periodically to saturate said body magnetically, subjecting the thus periodically-saturated body simultaneously to the action of a second magnetic field of relatively low strength and of different frequency than said first-mentioned field, and investigating the amplitude of the voltage induced in said testing circuit while said body is subjected to both of said fields.

3. In a method for electrically testing a magnetizable body for physical defects which involves inducing in a testing circuit an alternating voltage having an amplitude influenced by said body, the improvement which comprises subjecting said body to a first alternating magnetic field of relatively high strength and relatively low frequency in a manner substantially to periodically saturate said body magnetically, subjecting the thus periodically-saturated body simultaneously to the action of a second alternating magnetic field of relatively low strength and relatively high frequency, and investigating the instantaneous amplitude of the voltage induced in said testing circuit at a predetermined point in the cycle of one of said fields.

4. In a method for electrically testing a magnetizable body for physical defects which involves inducing in a testing circuit an alternating voltage having an amplitude influenced by said body, the improvement which comprises subjecting said body to a first alternating magnetic field of relatively high strength and relatively low frequency in a manner substantially to periodically saturate said body magnetically, subjecting the thus periodically-saturated body simultaneously to the action of a second alternating magnetic field of relatively low strength and relatively high frequency, the frequency of said second field being synchronously related to the frequency of said first-mentioned field, and investigating the instantaneous amplitude of the voltage induced in said testing circuit at a predetermined point in the cycle of said field of higher strength at which said voltage is influenced more by eddy-current distribution than by the magnetic flux in said body.

5. In a method for electrically testing a magnetizable body for physical defects which involves inducing in a testing circuit an alternating voltage having an amplitude influenced by said body, the improvement which comprises subjecting said body to a first alternating magnetic field of relatively high strength and relatively low frequency in a manner substantially to periodically saturate said body magnetically, subjecting the thus periodically-saturated body simultaneously to the action of a second alternating magnetic field of relatively low strength and relatively high frequency, and investigating the instantaneous amplitude of the voltage induced in said testing circuit at a point in the cycle of said field of higher strength corresponding to maximum magnetization of said body.

6. In a method for electrically testing a magnetizable body for physical defects which involves inducing in a testing circuit an alternating voltage having an amplitude influenced by said body, the improvement which comprises subjecting said body to a first alternating magnetic field of relatively low frequency in a manner substantially to periodically saturate said body magnetically, subjecting the thus periodically-saturated body simultaneously to the action of a second alternating magnetic field of relatively high frequency, and investigating the instantaneous amplitude of the voltage induced in said testing circuit at a point in the cycle of said field of lower frequency corresponding to maximum magnetization of said body.

7. In a method for electrically testing a metallic body for physical defects which involves inducing in a testing circuit an alternating voltage having an amplitude influenced by said body, the improvement which comprises subjecting said body simultaneously to the action of a direct-current field and a plurality of alternating fields of different frequencies, and investigating the amplitude of the voltage induced in said testing circuit while said body is subjected to said fields.

8. In a method for electrically testing a magnetizable body for physical defects which involves inducing in a testing circuit an alternating voltage having an amplitude influenced by said body, the improvement which comprises subjecting said body to a direct-current magnetic field and to a first alternating magnetic field of low frequency, subjecting said body simultaneously to the action of a second alternating magnetic field of relatively high frequency, and investigating the instantaneous amplitude of the voltage induced in said testing circuit at a predetermined point in the cycle of said first alternating field.

9. In a method for electrically testing a magnetizable body for physical defects which involves inducing in a testing circuit an alternating voltage having an amplitude influenced by said body, the improvement which comprises subjecting said body to a direct-current magnetic field and to a first alternating magnetic field of low frequency in a manner substantially to saturate said body magnetically, subjecting the thus-saturated body simultaneously to the action of a second alternating magnetic field of relatively high frequency, and investigating the instantaneous amplitude of the voltage induced in said testing circuit at a point in the cycle of said first alternating field corresponding to maximum magnetization of said body.

10. In apparatus for detecting defects in metallic bodies, a low-frequency energizing coil and an even number of high-frequency energizing coils arranged with reversed polarity with respect to each other and symmetrically with respect to said low-frequency coil, a low-frequency test coil and an even number of high-frequency test coils arranged with reversed polarity with respect to each other and symmetrically with respect to said low-frequency coils, said low-frequency coils being inductively related and said high-frequency coils being inductively related, and means for inserting a metallic body symmetrically within the fields of said coils.

11. In apparatus for detecting defects in metallic bodies, a set of low-frequency and high-frequency energizing coils and a set of low-frequency and high-frequency test coils, said energizing coils being inductively related to said test coils, said high-frequency energizing coils being divided into an even number symmetrically disposed in reversed polarity with respect to each other, said high-frequency test coils being divided into an even number symmetrically disposed in reversed polarity with respect to each other, and said low-frequency test coil being symmetrically disposed with respect to all of said high-frequency coils, whereby substantially no high-frequency voltage is induced in said low-frequency coil.

12. In apparatus for detecting defects in metallic bodies, a set of low-frequency and high-frequency energizing coils, a set of low-frequency and high-frequency test coils, and means comprising the physical disposition of said coils effectively preventing high-frequency voltage from being induced in the low-frequency test coil and effectively preventing low-frequency voltage from being induced in the high-frequency test coils.

13. In apparatus for detecting defects in metallic bodies, a low-frequency coil system comprising primary and secondary windings, a high-frequency coil system comprising primary and secondary windings, high-pass and low-pass filter means connected, respectively, in the circuits of the high-frequency and low-frequency secondary windings, and means for inserting a metallic body symmetrically within the fields of said coil systems.

14. In apparatus for detecting defects in magnetizable bodies, a low-frequency coil system comprising primary and secondary windings, a high-frequency coil system comprising primary and secondary windings, high-pass and low-pass filter means connected, respectively, in the circuits of the high-frequency and low-frequency secondary windings, a magnetic yoke in magnetic relation to the low-frequency primary winding, and means for inserting a magnetizable body within the fields of said coil systems and in magnetic relation to said yoke.

15. In apparatus for detecting defects in magnetizable bodies, a low-frequency test coil, a high-frequency transformer comprising primary and secondary windings, the primary winding comprising two coils mutually reversed in polarity and symmetrically disposed with respect to said low-frequency test coil, the secondary winding comprising two coils mutually reversed in polarity and also symmetrically disposed with respect to said low-frequency test coil, a magnetic yoke disposed to be in magnetic relation to said magnetizable body, and a low-frequency energizing coil in magnetic relation to said yoke.

16. In apparatus for detecting defects in metallic bodies, a low-frequency coil system comprising primary and secondary windings, a high-frequency coil system comprising primary and secondary windings, high-pass and low-pass filter means connected, respectively, in the circuits of the high-frequency and low-frequency secondary windings, a direct-current winding, and means for inserting a metallic body within the fields of all of said windings.

17. In apparatus for detecting defects in magnetizable bodies, a low-frequency coil system comprising primary and secondary windings, a high-frequency coil system comprising primary and secondary windings, high-pass and low-pass filter means connected, respectively, in the circuits of the high-frequency and low-frequency secondary windings, a direct-current winding, a magnetic yoke in magnetic relation to the low-frequency primary winding, and means for inserting a magnetizable body within the fields of said coil systems and of said direct-current winding and in magnetic relation to said yoke.

THEODOR ZUSCHLAG.